(12) United States Patent
Liu et al.

(10) Patent No.: US 12,432,493 B2
(45) Date of Patent: Sep. 30, 2025

(54) METHOD AND ELECTRONIC DEVICE FOR TRAINING COMPLEX NEURAL MODEL OF ACOUSTIC ECHO CANCELLATION

(71) Applicant: MediaTek Singapore Pte. Ltd., Singapore (SG)

(72) Inventors: Bozhong Liu, Singapore (SG); Xiaoxi Yu, Singapore (SG); Hantao Huang, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 219 days.

(21) Appl. No.: 18/237,904

(22) Filed: Aug. 25, 2023

(65) Prior Publication Data

US 2025/0071480 A1 Feb. 27, 2025

(51) Int. Cl.
*H04R 3/02* (2006.01)
*G06N 3/045* (2023.01)
*G06N 3/08* (2023.01)
*G06N 3/0895* (2023.01)

(52) U.S. Cl.
CPC .............. *H04R 3/02* (2013.01); *G06N 3/0895* (2023.01)

(58) Field of Classification Search
CPC ........ H04R 3/02; G06N 3/0895; G06N 3/045; G06N 3/08
USPC ................................ 381/71.1, 73.1, 94.1, 13
See application file for complete search history.

(56) References Cited

U.S. PATENT DOCUMENTS

| | | | |
|---|---|---|---|
| 2023/0147707 A1* | 5/2023 | Colich | H04R 7/04 381/150 |
| 2024/0005939 A1* | 1/2024 | Cutler | G10L 15/16 |
| 2024/0404541 A1* | 12/2024 | Yu | G10L 21/0216 |

* cited by examiner

*Primary Examiner* — Thjuan K Addy
(74) *Attorney, Agent, or Firm* — Winston Hsu

(57) ABSTRACT

A method and an electronic device for training a complex neural model of acoustic echo cancellation (AEC). The method includes: generating an anchor audio pair, a positive audio pair and a negative audio pair according to multiple near-end signals and multiple acoustic echo signals; utilizing the complex neural model to extract an anchor audio feature, a positive audio feature and a negative audio feature from the anchor audio pair, the positive audio pair and the negative pair, respectively; calculating a loss function according to the anchor audio feature, the positive audio feature and the negative audio feature; and tuning at least one parameter of the complex neural model according to the loss function.

16 Claims, 3 Drawing Sheets

METHOD AND ELECTRONIC DEVICE FOR TRAINING COMPLEX NEURAL MODEL OF ACOUSTIC ECHO CANCELLATION

BACKGROUND

The present invention is related to neural networks, and more particularly, to a method and an electronic device for training a complex neural model of acoustic echo cancellation (AEC).

For audio communication, acoustic echoes are common issues to be solved. For example, when a far-end speaker's voice is played by a near-end speaker and is picked up by a near-end microphone, the far-end speaker may hear an acoustic echo of his/her own voice, which can be very annoying and distracting. Related arts proposed some solutions to suppress an impact of the acoustic echo in order to improve quality of the audio communication, there are still some advantages. For example, the related art solutions may be applicable to far-end single-only scenarios (e.g. a condition where only the far-end speaker is speaking), but relatively large residual echoes may exist when near-end and far-end speech are present simultaneously. As conference calls are widely utilized to replace physical meetings recently, methods for reducing the acoustic echoes in a conference call become important.

Thus, there is a need for a novel method and associated electronic device, to effectively cancel the acoustic echoes during the audio communication without introducing any side effect or in a way that is less likely to introduce side effects.

SUMMARY

An objective of the present invention is to provide a method and an electronic device for training a complex neural model of acoustic echo cancellation (AEC), which can effectively improve AEC performance.

At least one embodiment of the present invention provides a method for training a complex neural model of AEC. The method comprises: generating an anchor audio pair, a positive audio pair and a negative audio pair according to multiple near-end signals and multiple acoustic echo signals; utilizing the complex neural model to extract an anchor audio feature, a positive audio feature and a negative audio feature from the anchor audio pair, the positive audio pair and the negative pair, respectively; calculating a loss function according to the anchor audio feature, the positive audio feature and the negative audio feature; and tuning at least one parameter of the complex neural model according to the loss function.

At least one embodiment of the present invention provides an electronic device for training a complex neural model of AEC. The electronic device comprises a storage device and a processor, wherein the processor is coupled to the storage device. The storage device is configured to store a program code corresponding to training of the complex neural model. The processor is configured to execute the training of the complex neural model according to the program code. In particular, the processor generates an anchor audio pair, a positive audio pair and a negative audio pair according to multiple near-end signals and multiple acoustic echo signals. The processor utilizes the complex neural model to extract an anchor audio feature, a positive audio feature and a negative audio feature from the anchor audio pair, the positive audio pair and the negative pair, respectively. The processor calculates a loss function according to the anchor audio feature, the positive audio feature and the negative audio feature. The processor tunes at least one parameter of the complex neural model according to the loss function.

The method and the electronic device provided by the embodiments of the present invention can adopt a contrastive learning (CL) in a pre-training framework of the AEC, which greatly improve the AEC performance. In addition, the embodiments of the present invention will not greatly increase additional costs. Thus, the present invention can improve the AEC performance without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
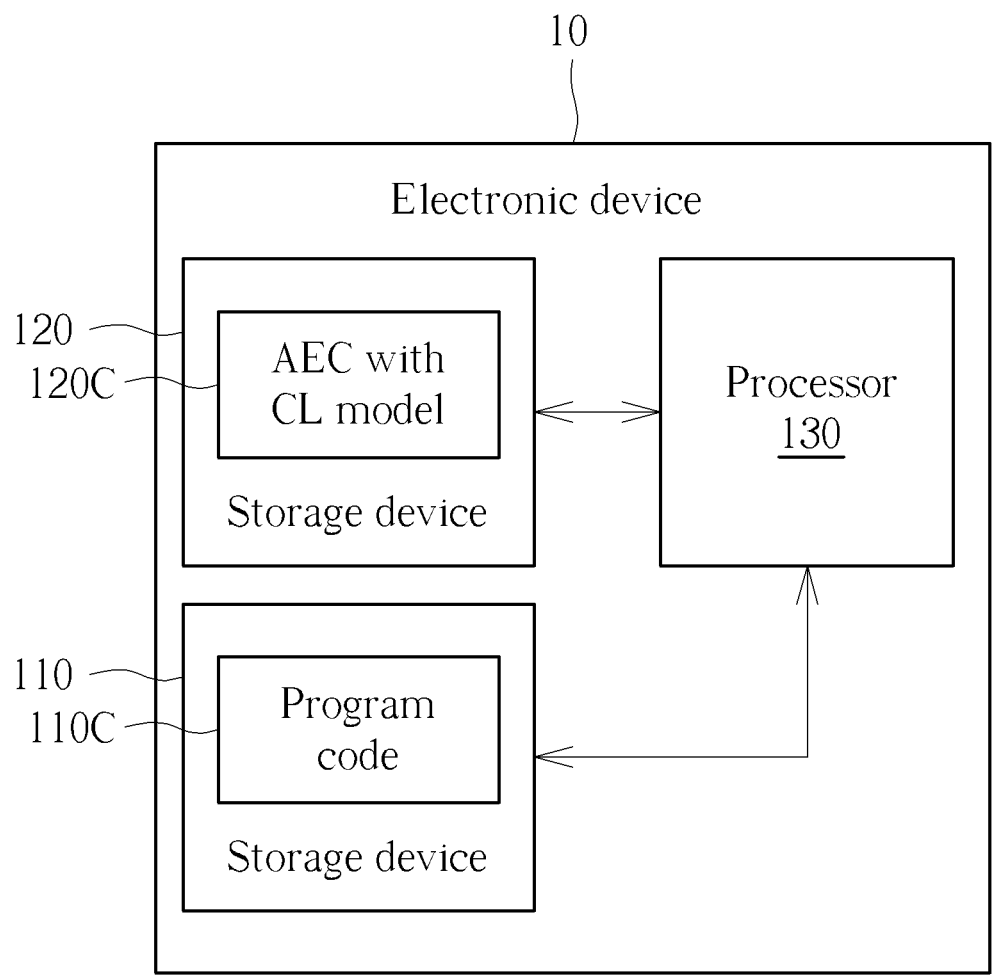
FIG. 1 is a diagram illustrating an electronic device according to an embodiment of the present invention.

FIG. 1 is a diagram illustrating an electronic device 10 according to an embodiment of the present invention, where the electronic device 10 is configured to train a complex neural model of acoustic echo cancellation (AEC). As shown in FIG. 1, the electronic device 10 may comprise storage devices 110 and 120 and a processor 130, where the processor 130 is coupled to the storage devices 110 and 120. In this embodiment, the storage device 110 is configured to store a program code 110C corresponding to training of the complex neural model, and the storage device 120 is configured to store a code corresponding to an AEC with contrastive learning (CL) model 120C, where the AEC with CL model 120C is an example of the complex neural model. In this embodiment, the processor 130 is configured to execute the training of the AEC with CL model 120C according to the program code 110C. For example, the processor 130 may generate an anchor audio pair, a positive audio pair and a negative audio pair according to multiple near-end signals and multiple acoustic echo signals. The processor 130 may utilize the AEC with CL model 120C to extract an anchor audio feature, a positive audio feature and a negative audio feature from the anchor audio pair, the positive audio pair and the negative pair, respectively. The processor 130 may calculate a loss function according to the anchor audio feature, the positive audio feature and the negative audio feature. The processor 130 may tunes at least one parameter of the AEC with CL model 120C according to the loss function.

In this embodiment, the at least one parameter may be tuned to make the AEC with CL model 120C able to distinguish the multiple near-end signals from the multiple acoustic echo signals, where the at least one parameter may correspond to coefficient(s) or setting(s) of an adaptive filtering device in an AEC system. For example, the multiple near-end signals and the multiple acoustic echo signals may be provided by a public database which is established for a purpose of training AEC-related model. The multiple near-end signals may be data samples of near-end speech made by a near-end audio source (e.g. a person) positioned in a near-end space, and the multiple acoustic echo signals may be data samples of far-end speech (which is made by a far-end audio source such as a person positioned in a far-end space, and is transmitted to the near-end space via an audio communication system) played by a speaker positioned in the near-end space. Thus, when a microphone positioned in the near-end space receive audio signals comprising the near-end speech and the far-end speech, the AEC with CL model 120C can distinguish the near-end speech from the far-end speech in order to perform the AEC (e.g. cancelling components corresponding to the far-end speech from the audio signals received by the microphone via the adaptive filtering device mentioned above) after the training of the AEC with CL model 120C is completed.

Figure 2:
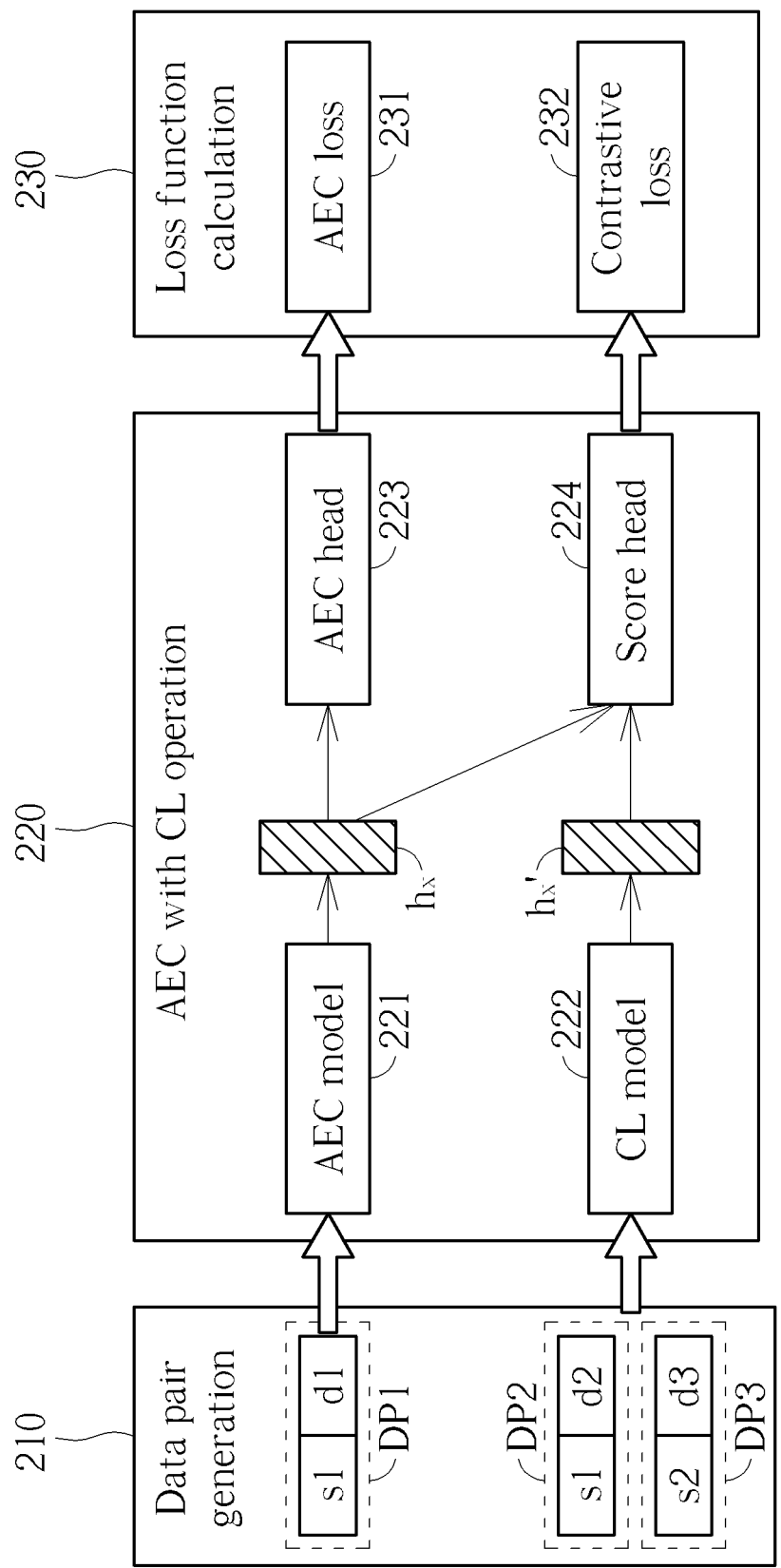
FIG. 2 is a diagram illustrating a pre-training framework of acoustic echo cancellation (AEC) according to an embodiment of the present invention.

FIG. 2 is a diagram illustrating a pre-training framework of AEC (e.g. a pre-training scheme of the AEC with CL model 120C) according to an embodiment of the present invention, where the pre-training framework shown in FIG. 2 may be an example of a portion or all of the training of the AEC with CL model 120C executed by the processor 130. For example, the program code 110C may comprise one or more modules, and the processor 130 may execute one or more operation such as data pair generation 210, an AEC with CL operation 220 and loss function calculation 230 upon the AEC with CL model 120C according to the one or more modules.

When performing the data pair generation 210, the processor 130 may group a near-end signal s1 among the multiple near-end signals and an acoustic echo signal d1 among the multiple acoustic echo signals into one audio pair such as an anchor audio pair DP1 (which may be an example of the anchor audio pair mentioned above), group the near-end signal s1 among the multiple near-end signals and an acoustic echo signal d2 among the multiple acoustic echo signals into one audio pair such as a positive audio pair DP2 (which may be an example of the positive audio pair mentioned above), and group a near-end signal s2 among the multiple near-end signals and an acoustic echo signal d3 among the multiple acoustic echo signals into one audio pair such as a negative audio pair DP3 (which may be an example of the negative audio pair mentioned above). Thus, the anchor audio pair DP1 comprises the near-end signal s1 and the acoustic echo signal d1, the positive audio pair DP2 comprises the near-end signal s1 and the acoustic echo signal d2, and the negative audio pair DP3 comprises the near-end signal s2 and the acoustic echo signal d3. In addition, the anchor audio pair DP1 and the positive audio pair DP2 may share the same near-end signal (i.e. the near-end signal s1), but the anchor audio pair DP1 and the negative audio pair DP3 may have different near-end signals (e.g. the near-end signals s1 and s2 are different from each other), where the anchor audio pair DP1, the positive audio pair DP2 and the negative audio pair DP3 have different acoustic echo signals (e.g. the acoustic echo signal d1, d2 and d3 are different from one another).

When performing the AEC with CL operation 220, the processor 130 may utilize the AEC with CL model 120C to extract the anchor audio feature, the positive audio feature and the negative audio feature from the anchor audio pair, the positive audio pair and the negative pair, respectively. For example, the AEC with CL model 120C may comprise an AEC model 221 and a CL model 222, where the processor 130 may utilize the AEC model 221 to extract an audio feature $h_x$ (which may be an example of the anchor audio feature) from the anchor audio pair DP1, and may utilize the CL model 222 to extract the positive audio feature from the positive audio pair DP2 and the negative audio feature from the negative audio pair DP3, where an audio feature $h_x'$ shown in FIG. 2 may collectively represent the positive audio feature and the negative audio feature. After the audio features $h_x$ and $h_x'$ are obtained, the processor may utilize an AEC controlling module such as an AEC head 223 of the AEC with CL model 120C to receive the audio features $h_x$ and utilize an CL scoring module such as a score head 224 of the AEC with CL model 120C to receive the audio feature $h_x'$. It should be note that the score head 224 may use both the audio features $h_x$ and $h_x'$ (e.g. all of the anchor audio feature, the positive audio feature and the negative audio feature) to generate related calculation result(s) for further usage in contrastive loss function calculation 232 (labeled "Contrastive loss" in FIG. 2 for brevity), but the AEC head 223 uses the features $h_x$ only (e.g. the anchor audio feature only) and prevent using the feature $h_x'$ (e.g. the positive audio feature and the negative audio feature) for further usage in AEC loss function calculation 231 (labeled "AEC loss" in FIG. 2 for brevity). In detail, the processor 130 may utilize the AEC head 223 to perform AEC-related operation (e.g. feature extraction, acoustic separation and mask optimization) according to the anchor audio feature (e.g. the audio feature $h_x$), but the present invention is not limited thereto. In addition, the processor 130 may utilize the score head 224 to calculate a positive similarity score between the anchor audio feature and the positive audio feature, and calculate a negative similarity score between the anchor audio feature and the negative audio feature. It should be noted that the present invention focuses on utilizing the CL model 222 to pre-train the AEC with CL model 120C (e.g. the AEC model 221 therein), in order to make the AEC with CL model 120C (e.g. the AEC model 221 therein) be able to distinguish the near-end speech from the far-end speech before fine-tuning the AEC model 221, where detailed implementation of the AEC model 221 supported by the CL model 222 may vary. For example, the AEC model 221 and the AEC head 223 can be implemented by any other suitable AEC networks which are well known by those skilled in this art, and are not limited by the examples mentioned above.

When performing the loss function calculation 230, the processor 130 may 232 perform the AEC loss function calculation 231 to calculate an AEC loss function according to the anchor audio feature such as the audio feature $h_x$ (more particularly, according to at least one output of the AEC head 223 which is generated according to the audio feature $h_x$), and the processor 130 may perform the contrastive loss function calculation 232 to calculate a contrastive loss function $L_{CL}$ according to the positive similarity score and the negative similarity score output from the score head 224. As mentioned above, the detailed implementation of the AEC model 221 supported by the CL model 222 may vary, and details of the AEC loss function calculation 231 may accordingly vary. In addition, the AEC loss function calculation 231 is not a key point of the present invention, which may be implemented by any suitable manner that are well known by those skilled in this art, and will not be described in detail here for brevity. As for the contrastive loss function calculation 232, the processor 232 may calculate the contrastive loss function $L_{CL}$ by binary cross-entropy as follows:

$$L_{CL} = -\log \frac{\exp(\mathrm{sim}(x, x^+))}{\sum_{x^- \in X^-(x) \cup \{x^+\}} \exp(\mathrm{sim}(x, x^-))}$$

where sim(x, x$^+$) represents the positive similarity score, and sim(x, x$^-$) represents the negative similarity score. The processor 130 may tune the at least one parameter of the AEC with CL model 120C (e.g. at least one parameter of the AEC model 221 and/or the CL model 222) to maximize the positive similarity score and minimize the negative similarity score. For example, a higher similarity score between two features means the two features are more similar to each other, and a lower similarity score between two features means the two feature is more different from each other, where an objective of tuning the at least one parameter of the AEC with CL model 120C is to make the anchor audio feature is similar to the positive audio feature as much as possible (e.g. maximizing the positive similarity score) and make the anchor audio feature is different from the negative audio feature as much as possible (e.g. minimizing the negative similarity score), thereby making the AEC with CL model 120C be able to distinguish the near-end speech from the far-end speech.

As mentioned above, the processor 130 may tunes the at least one parameter of the AEC with CL model 120C according to the loss function, where the processor 130 may calculate the loss function such as an overall loss function $L_{all}$ according to the AEC loss function $L_{AEC}$ and the contrastive loss function $L_{CL}$. For example, $L_{ALL} = L_{AEC} + \alpha \times L_{CL}$, where $\alpha$ represents a weight parameter. During a CL pre-training stage, (e.g. a stage of performing the pre-training mentioned in the embodiment of FIG. 2), the processor 130 may set the weight parameter $\alpha$ to be one, and the processor 130 may tunes at least one parameter of the AEC with CL model 120C (e.g. at least one parameter of the AEC model 221 and/or the CL model 222) according to $L_{AEC} + L_{CL}$. During an AEC fine-tuning stage (e.g. a stage of performing fine-tuning of the AEC model 221), the processor 130 may set the weight parameter $\alpha$ to be zero, and the processor 130 may tunes at least one parameter of the AEC model 221 according to $L_{AEC}$. As the fine-tuning of the AEC model 221 is not a main point of the present invention, and those skilled in this art may adopt well known AEC network(s) and associated tuning mechanism to the fine-tuning of the AEC model 221, related details of the fine-tuning of the AEC model 221 are omitted here for brevity.

Figure 3:
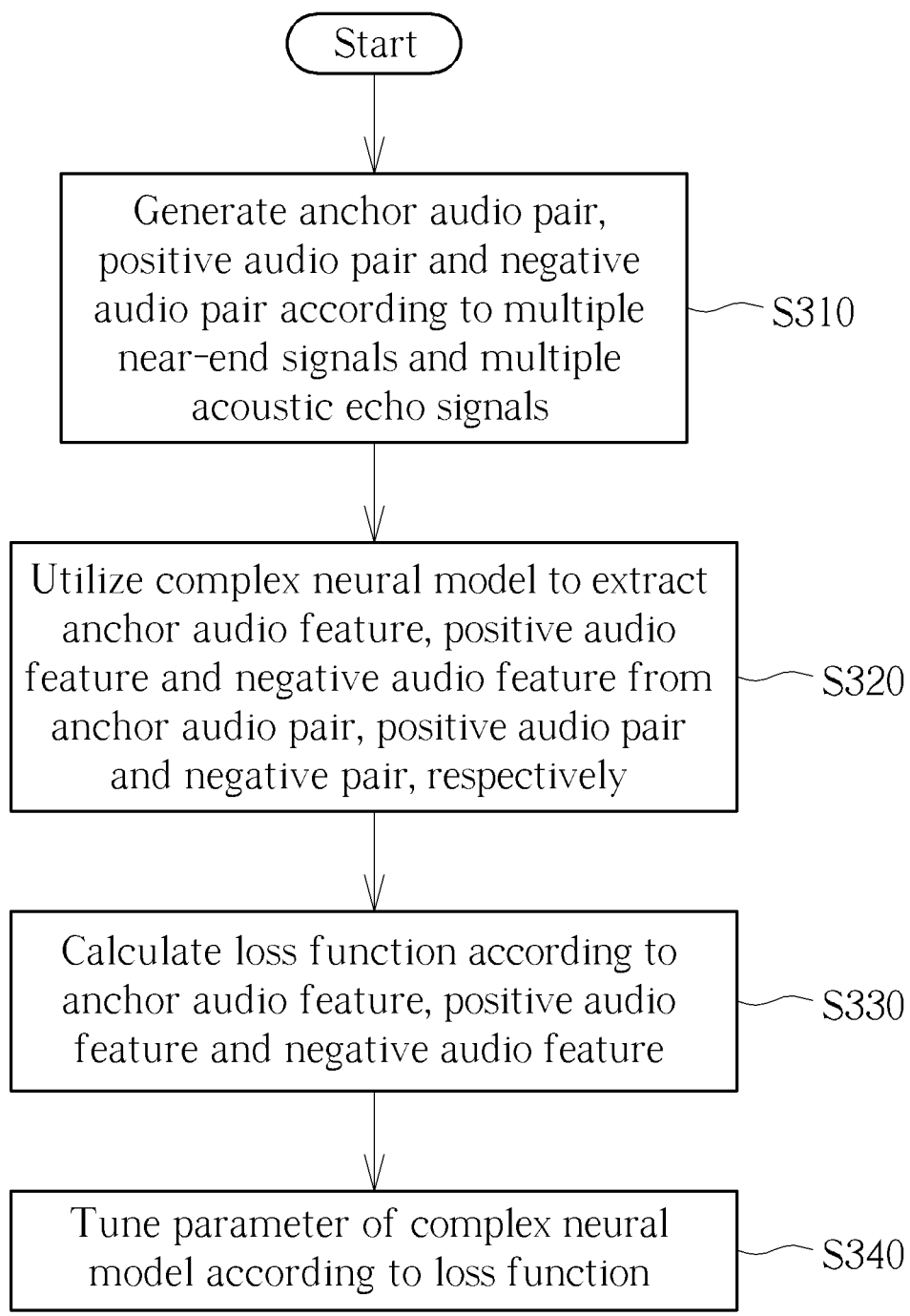
FIG. 3 is a diagram illustrating working flow of a method for training a complex neural model of AEC according to an embodiment of the present invention.

FIG. 3 is a diagram illustrating a working flow of a method for training a complex neural model of AEC (e.g. the AEC with CL model 120C shown in FIG. 1) according to an embodiment of the present invention, where the working flow shown in FIG. 3 may be executed by the electronic device 10 (e.g. the processor 130 running the program code 110C) shown in FIG. 1. It should be noted that the working flow shown in FIG. 3 is for illustrative purposes only, and is not meant to be a limitation of the present invention. For example, one or more steps may be added, deleted or modified in the working flow shown in FIG. 3. In addition, if a same result can be obtained, these steps do not have to be executed in the exact order shown in FIG. 3.

In Step S310, the processor 130 may generate an anchor audio pair, a positive audio pair and a negative audio pair according to multiple near-end signals and multiple acoustic echo signals.

In Step S320, the processor 130 may utilize the complex neural model to extract an anchor audio feature, a positive audio feature and a negative audio feature from the anchor audio pair, the positive audio pair and the negative pair, respectively.

In Step S330, the processor 130 may calculate a loss function according to the anchor audio feature, the positive audio feature and the negative audio feature.

In Step S340, the processor 130 may tune at least one parameter of the complex neural model according to the loss function.

To summarize, the method and the electronic device 10 provided by the embodiment of the present invention utilize a CL model to support pre-training of an AEC model, to make a complex neural model (which comprises the CL model and the AEC model) be able to distinguish near-end speech and far-end speech before starting fine-tuning of the AEC model. With aid of the pre-training, the complex neural model may achieve better performance in AEC-related operations. In addition, the embodiment of the present invention will not greatly increase additional costs. Thus, the present invention can improve overall performance of AEC without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for training a complex neural model of acoustic echo cancellation (AEC), comprising:
   generating an anchor audio pair, a positive audio pair and a negative audio pair according to multiple near-end signals and multiple acoustic echo signals;
   utilizing the complex neural model to extract an anchor audio feature, a positive audio feature and a negative audio feature from the anchor audio pair, the positive audio pair and the negative pair, respectively;
   calculating a loss function according to the anchor audio feature, the positive audio feature and the negative audio feature; and
   tuning at least one parameter of the complex neural model according to the loss function.

2. The method of claim 1, wherein the at least one parameter is tuned to make the complex neural model able to distinguish the multiple near-end signals from the multiple acoustic echo signals.

3. The method of claim 1, wherein calculating the loss function according to the anchor audio feature, the positive audio feature and the negative audio feature comprises:
   calculating a positive similarity score between the anchor audio feature and the positive audio feature;
   calculating a negative similarity score between the anchor audio feature and the negative audio feature;
   calculating the loss function according to the positive similarity score and the negative similarity score.

4. The method of claim 3, wherein tuning the at least one parameter of the complex neural model according to the loss function comprises:
  tuning the at least one parameter of the complex neural model to maximize the positive similarity score and minimize the negative similarity score.

5. The method of claim 3, wherein calculating the loss function according to the anchor audio feature, the positive audio feature and the negative audio feature further comprises:
  calculating an AEC loss function according to the anchor audio feature;
  calculating a contrastive loss function according to the positive similarity score and the negative similarity score; and
  calculating the loss function according to the AEC loss function and the contrastive loss function.

6. The method of claim 5, wherein $L_{AEC}$ represents the AEC loss function, $L_{CL}$ represents the contrastive loss function, $L_{ALL}$ represents the loss function, $\alpha$ represents a weight parameter, and $L_{ALL}=L_{AEC}+\alpha \times L_{CL}$.

7. The method of claim 6, wherein $\alpha$ is set to be one during a contrastive learning pre-training stage, and $\alpha$ is set to be zero during an AEC fine-tuning stage.

8. The method of claim 1, wherein the anchor audio pair comprises a first near-end signal among the multiple near-end signals and a first acoustic echo signal among the multiple acoustic echo signals, the positive audio pair comprises the first near-end signal among the multiple near-end signals and a second acoustic echo signal among the multiple acoustic echo signals, and the negative audio pair comprises a second near-end signal among the multiple near-end signals and a third acoustic echo signal among the multiple acoustic echo signals.

9. An electronic device for training a complex neural model of acoustic echo cancellation (AEC), comprises:
  a storage device, configured to store a program code corresponding to training of the complex neural model;
  a processor, coupled to the storage device, configured to execute the training of the complex neural model according to the program code, wherein:
    the processor generates an anchor audio pair, a positive audio pair and a negative audio pair according to multiple near-end signals and multiple acoustic echo signals;
    the processor utilizes the complex neural model to extract an anchor audio feature, a positive audio feature and a negative audio feature from the anchor audio pair, the positive audio pair and the negative pair, respectively;
    the processor calculates a loss function according to the anchor audio feature, the positive audio feature and the negative audio feature; and
    the processor tunes at least one parameter of the complex neural model according to the loss function.

10. The electronic device of claim 9, wherein the at least one parameter is tuned to make the complex neural model able to distinguish the multiple near-end signals from the multiple acoustic echo signals.

11. The electronic device of claim 9, wherein the processor utilizes the complex neural model to calculate a positive similarity score between the anchor audio feature and the positive audio feature and calculate a negative similarity score between the anchor audio feature and the negative audio feature, and the processor calculates the loss function according to the positive similarity score and the negative similarity score.

12. The electronic device of claim 11, wherein the processor tunes the at least one parameter of the complex neural model to maximize the positive similarity score and minimize the negative similarity score.

13. The electronic device of claim 11, wherein the processor calculates an AEC loss function according to the anchor audio feature, calculates a contrastive loss function according to the positive similarity score and the negative similarity score, and calculates the loss function according to the AEC loss function and the contrastive loss function.

14. The electronic device of claim 13, wherein $L_{AEC}$ represents the AEC loss function, $L_{CL}$ represents the contrastive loss function, $L_{ALL}$ represents the loss function, $\alpha$ represents a weight parameter, and $L_{ALL}=L_{AEC}+\alpha \times L_{CL}$.

15. The electronic device of claim 14, wherein $\alpha$ is set to be one during a contrastive learning pre-training stage, and $\alpha$ is set to be zero during an AEC fine-tuning stage.

16. The electronic device of claim 9, wherein the anchor audio pair comprises a first near-end signal among the multiple near-end signals and a first acoustic echo signal among the multiple acoustic echo signals, the positive audio pair comprises the first near-end signal among the multiple near-end signals and a second acoustic echo signal among the multiple acoustic echo signals, and the negative audio pair comprises a second near-end signal among the multiple near-end signals and a third acoustic echo signal among the multiple acoustic echo signals.

* * * * *